(12) United States Patent
Horiuchi et al.

(10) Patent No.: US 7,813,860 B2
(45) Date of Patent: Oct. 12, 2010

(54) BRAKE FORCE DETECTING DEVICE

(75) Inventors: Takehiro Horiuchi, Wako (JP); Hiromi Inagaki, Wako (JP); Takayuki Ohmori, Wako (JP); Shigehiro Yoshiuchi, Osaka (JP); Noritaka Ichinomiya, Nara (JP)

(73) Assignees: Honda Motor Co., Ltd., Tokyo (JP); Matsushita Electric Industrial Co., Ltd., Osaka (JP)

( * ) Notice: Subject to any disclaimer, the term of this patent is extended or adjusted under 35 U.S.C. 154(b) by 368 days.

(21) Appl. No.: 11/901,479

(22) Filed: Sep. 18, 2007

(65) Prior Publication Data

US 2008/0077302 A1    Mar. 27, 2008

(30) Foreign Application Priority Data

Sep. 22, 2006 (JP) ............................. 2006-257071
Mar. 29, 2007 (JP) ............................. 2007-087048

(51) Int. Cl.
*G06F 7/00* (2006.01)
(52) U.S. Cl. ..................... 701/80; 118/18 A; 118/73.39
(58) Field of Classification Search ................... 701/80; 188/18 A, 73.39
See application file for complete search history.

(56) References Cited

U.S. PATENT DOCUMENTS

| | | | | |
|---|---|---|---|---|
| 6,668,983 | B2* | 12/2003 | Drennen et al. | 188/181 T |
| 6,983,665 | B2* | 1/2006 | Miyazaki et al. | 73/862.474 |
| 2005/0029056 | A1* | 2/2005 | Baumgartner et al. | 188/1.11 L |
| 2006/0054424 | A1* | 3/2006 | Inoue et al. | 188/18 R |

FOREIGN PATENT DOCUMENTS

JP         06-123665        5/1994

* cited by examiner

*Primary Examiner*—Mark Hellner
(74) *Attorney, Agent, or Firm*—Carrier, Blackman & Assocites, PC; Joseph P. Carrier; William D. Blackman

(57) ABSTRACT

A brake force detecting device for detecting strain in a caliper bracket. The brake force detecting device includes a sensor plate fixed to the outside surface of a brake load receiving portion of the caliper bracket in the circumferential direction of a brake disc and a strain gauge attached to the sensor plate for detecting strain generated in the sensor plate. The strain gauge is connected to an amplifier.

6 Claims, 13 Drawing Sheets

BRAKE FORCE DETECTING DEVICE

BACKGROUND OF THE INVENTION

1. Field of the Invention

The present invention relates to a brake force detecting device for detecting a brake force produced by a disc brake.

2. Description of the Related Art

In the case of performing braking control for a vehicle, a brake force is one of the important items of information. For example, if a brake force actually applied during braking can be detected, the condition of a road surface can be easily estimated. If the condition of a road surface can be estimated, ABS control (antiskid brake system control) can be performed more precisely, and the vehicle can therefore be braked to a halt safely in a short distance. Further, if a brake force applied to each wheel can be detected in braking during turning of the vehicle or during running on a slippery road surface having a low coefficient of friction ($\mu$), the brake forces for all the wheels can be individually controlled to thereby allow safer running control of the vehicle.

Conventionally developed is a disc brake such that a load cell is provided on a supporting and engaging portion of a support member for friction pads or a strain gauge is attached to the supporting and engaging portion to thereby detect a brake force. A brake force measuring device including a support member for measurement of a brake force as provided between a brake caliper and a knuckle arm has been proposed in Japanese Patent Laid-open No. Hei 6-123665. The brake force measuring device disclosed in this publication includes a support member interposed between a brake caliper and a knuckle arm and having a pair of substantially perpendicular beams and also includes detecting means for detecting displacement of the beams.

According to the brake force measuring device described in Japanese Patent Laid-open No. Hei 6-123665, the brake force measuring device has an H-shaped cross section, so that the distance between the caliper bracket and the knuckle in the axial direction of the brake disc is large, causing an increase in size of the measuring device. Further, it is difficult to arrange a displacement detecting device between the two beams. Further, in the brake force measuring device described in Japanese Patent Laid-open No. Hei 6-123665, deformation due to the brake force in braking during forward running of the vehicle and deformation due to the brake force in braking during reverse running of the vehicle are generated in opposite directions. Accordingly, strain is generated both in a tensile direction and in a compressive direction, so that the zero point calibration for a sensor output is difficult, causing a problem on stabilization of a detection output.

SUMMARY OF THE INVENTION

It is therefore an object of the present invention to provide a brake force detecting device which can suppress the influence of a vertical force and a lateral force upon the strain in a sensor plate to thereby stabilize a detection output.

In accordance with an aspect of the present invention, there is provided a brake force detecting device for a braking device including a wheel support for rotatably supporting a wheel; a brake disc rotating with the wheel; a pair of friction pads provided on both sides of the brake disc; a brake caliper containing a pressure member for pressing the friction pads against the brake disc, the pressure member being moved toward and away from the brake disc in a direction parallel to the axis of the brake disc; and a caliper bracket for supporting the friction pads at opposite end portions thereof in the circumferential direction of the brake disc, the caliper bracket having a load receiving portion for receiving a brake load and a caliper supporting portion for supporting the brake caliper; the brake force detecting device comprising strain detecting means provided on the load receiving portion of the caliper bracket.

Preferably, the strain detecting means includes a sensor plate fixed to the outside surface of the load receiving portion; and a strain sensor fixed to the sensor plate for detecting strain. With this configuration, the sensor plate with the strain sensor mounted thereon is fixed to the outside surface of the brake load receiving portion. Accordingly, the sensor plate always undergoes compressive deformation upon braking. This compressive deformation of the sensor plate is detected by the strain sensor, thereby detecting a brake force. The sensor plate is mounted in a direction perpendicular to the direction of application of a brake load to the caliper bracket, so that the strain in the sensor plate can be stably detected by the strain sensor.

The brake load receiving portion of the caliper bracket directly receives a brake load, so that larger strain is generated in the brake load receiving portion and a high degree of detection accuracy can therefore be expected. Further, the strain in the sensor plate is generated only when the brake load is transmitted through the brake load receiving portion of the caliper bracket. Accordingly, the strain in the sensor plate is hardly influenced by a vertical force and a lateral force, so that a detection output can be stabilized.

Preferably, the load receiving portion has a recess on the back side of the sensor plate. With this configuration, the sensor plate can be strained more easily upon braking, so that a brake force can be detected more accurately.

Preferably, the load receiving portion includes a first load receiving portion adapted to come into contact with one of the opposite end portions of each friction pad and a second load receiving portion adapted to come into contact with the other of the opposite end portions of each friction pad; at least one of the opposite end portions of each friction pad or at least one of the first and second load receiving portions has a projection; and the projection is positioned outside of a line tangent to a circle about the center of rotation of the brake disc at the center of application of pressure of the pressure member.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
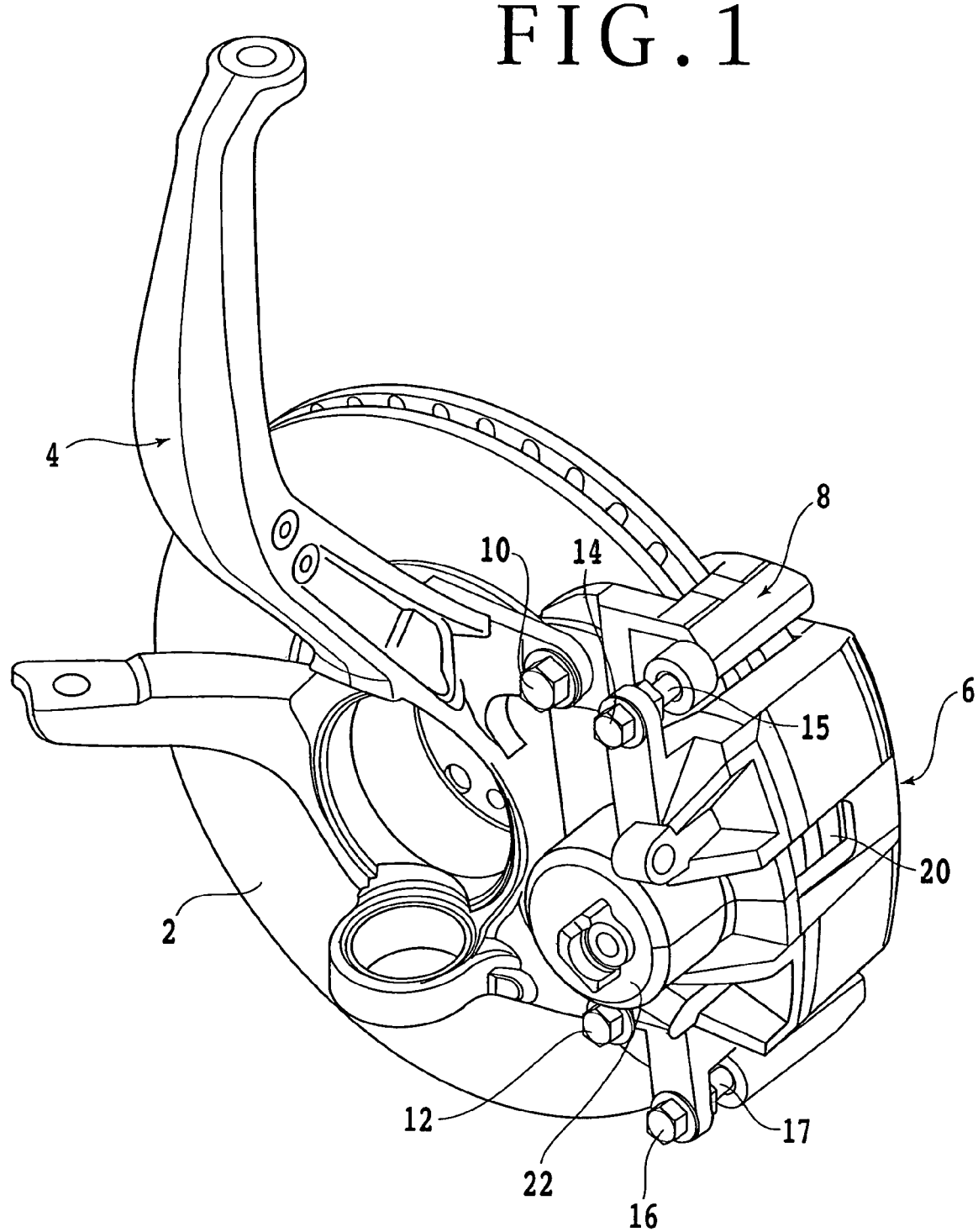
FIG. 1 is a perspective view of a disc brake including a brake force detecting device according to a first preferred embodiment of the present invention.
Figure 2:
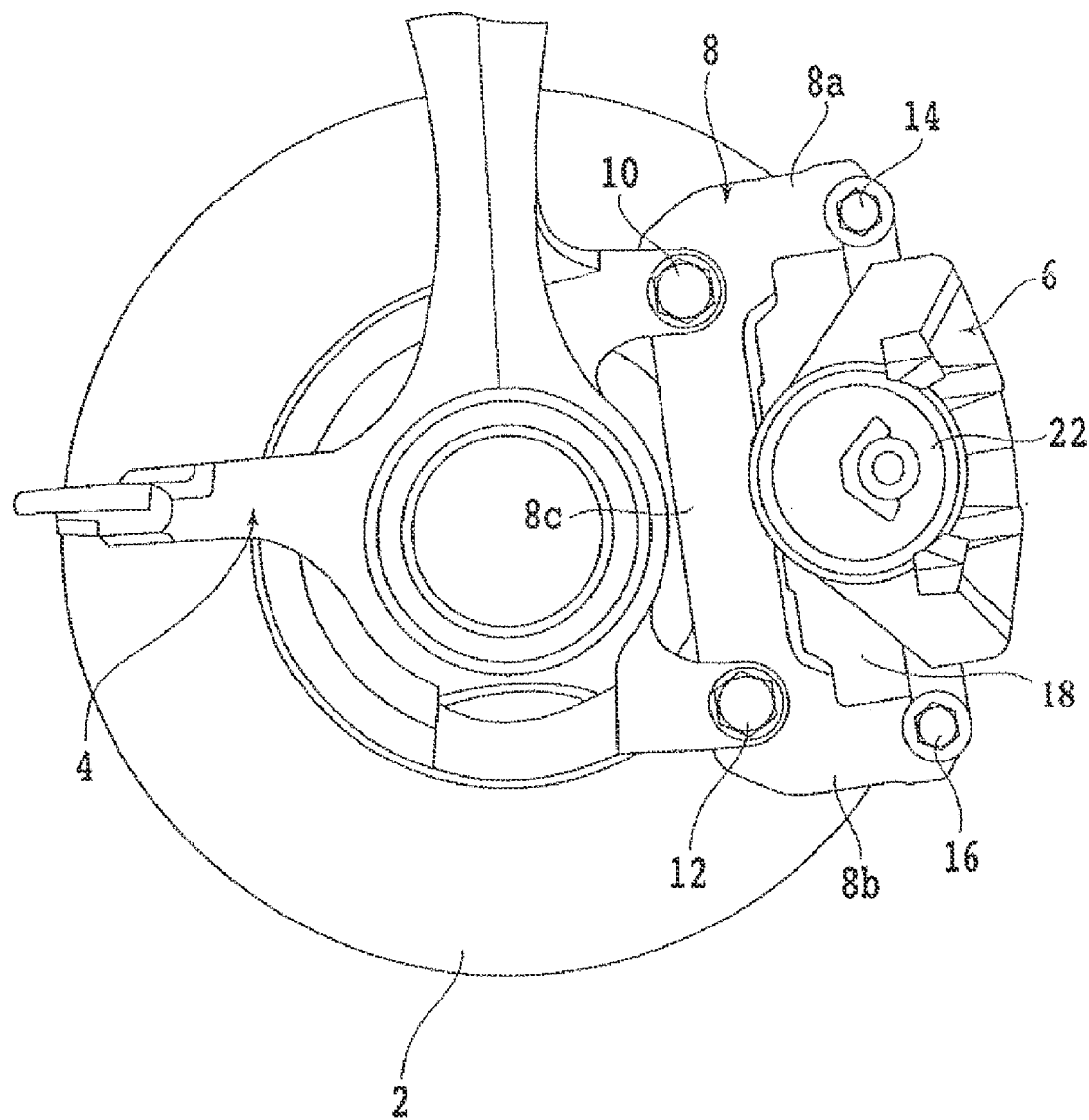
FIG. 2 is a left side view of the disc brake shown in FIG. 1.

Some preferred embodiments of the present invention will now be described in detail with reference to the drawings. FIG. 1 is a perspective view of a disc brake including a brake force detecting device according to a first preferred embodiment of the present invention. FIG. 2 is a left side view of the disc brake shown in FIG. 1. As shown in FIGS. 1 and 2, a brake disc (disc rotor) 2 is fixed to a wheel (not shown), so that the brake disc 2 is rotated with the wheel. Reference numeral 4 denotes a knuckle (wheel support) for rotatably supporting the wheel. The knuckle 4 is connected through a suspension (not shown) to a vehicle body (not shown).

Figure 3:
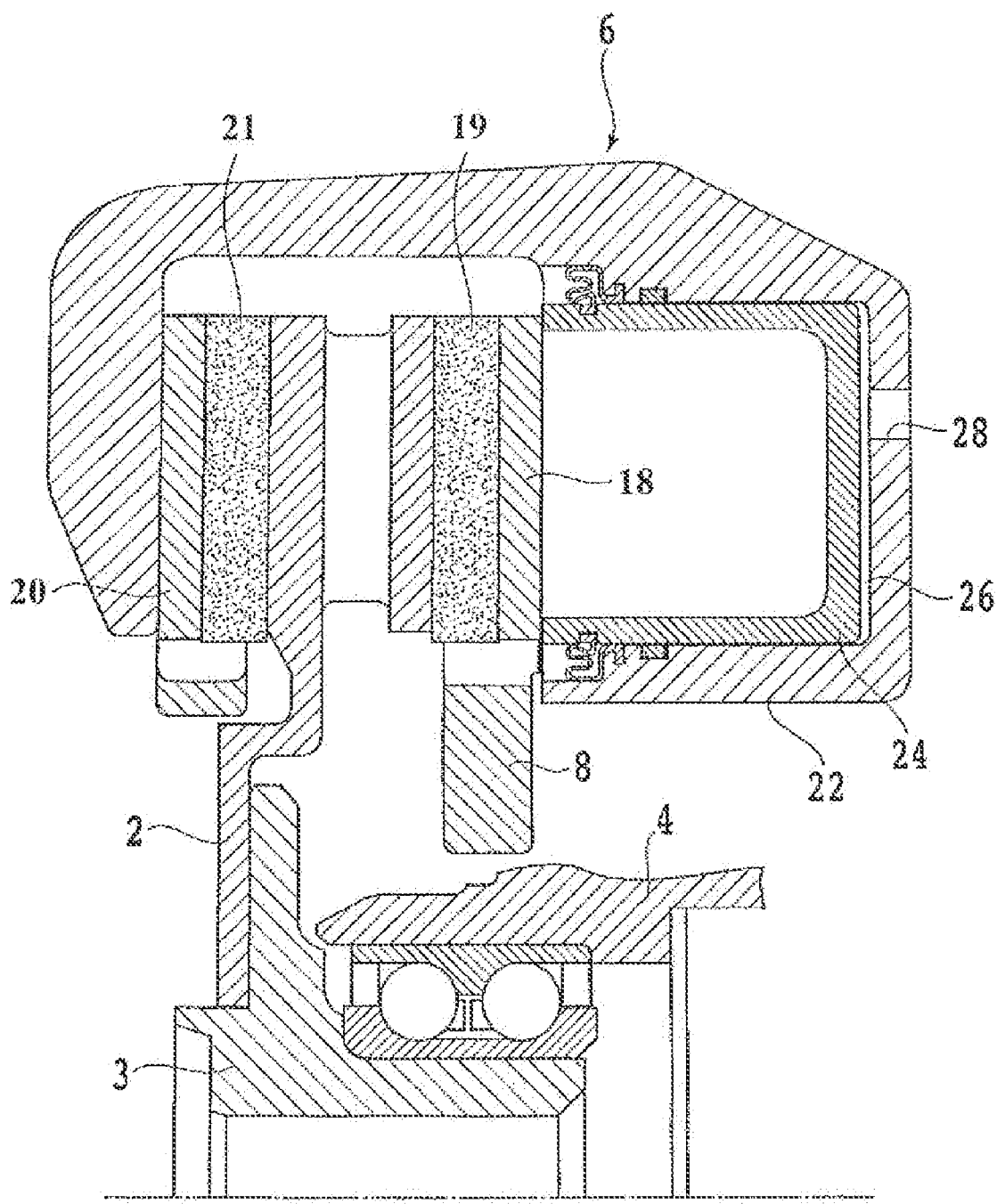
FIG. 3 is a schematic sectional view of the disc brake.

Reference numeral 8 denotes a caliper bracket, which is mounted to the knuckle 4 by two bolts 10 and 12. The caliper bracket 8 supports a pair of friction pads 19 and 21 at two opposite positions in the rotational direction (circumferential direction) of the brake disc 2, i.e., at a disc inlet position and a disc outlet position in the rotational direction of the brake disc 2. The friction pads 19 and 21 are provided on the axially opposite sides of the brake disc 2. The friction pads 19 and 21 are bonded to pad back plates 18 and 20, respectively. Two slide pins 15 and 17 are slidably engaged with the caliper bracket 8. The slide pins 15 and 17 are fixed to a brake caliper 6 by two bolts 14 and 16, respectively. As shown in FIG. 3, the brake caliper 6 contains a piston (pressure member) 24 adapted to be moved toward and away from the brake disc 2 in the axial direction thereof, thereby pressing the friction pads 19 and 21 against the brake disc 2.

The brake caliper 6 has an integral wheel cylinder 22, and the piston 24 is engaged in the wheel cylinder 22. A piston chamber 26 is defined between the wheel cylinder 22 and the piston 24, and a fluid pressure is supplied from a brake master cylinder through a pressure supply port 28 into the piston chamber 26. The brake disc 2 is connected to a hub 3. When a fluid pressure is supplied from the brake master cylinder through the pressure supply port 28 into the piston chamber 26, the piston 24 is pushed leftward as viewed in FIG. 3, so that the friction pad 19 is pressed on the brake disc 2. At the same time, the brake caliper 6 is moved rightward by a reaction force resulting from the pressure of the piston 24 applied through the friction pad 19 to the brake disc 2. As a result, the friction pad 21 is pressed on the brake disc 2, thereby braking the rotation of the brake disc 2.

Figure 4:
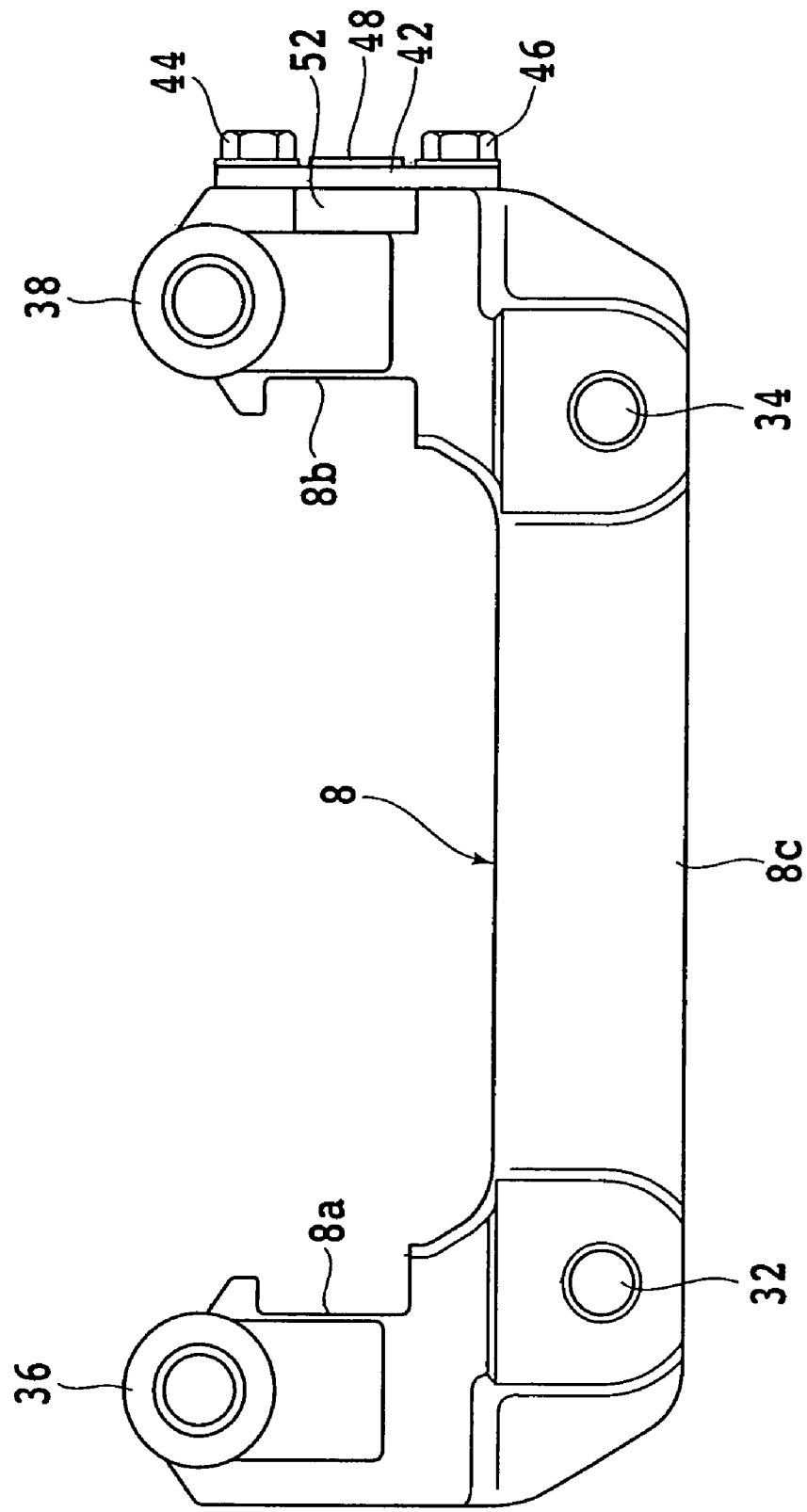
FIG. 4 is an elevational view of an essential part of the brake force detecting device according to the first preferred embodiment.
Figure 5:
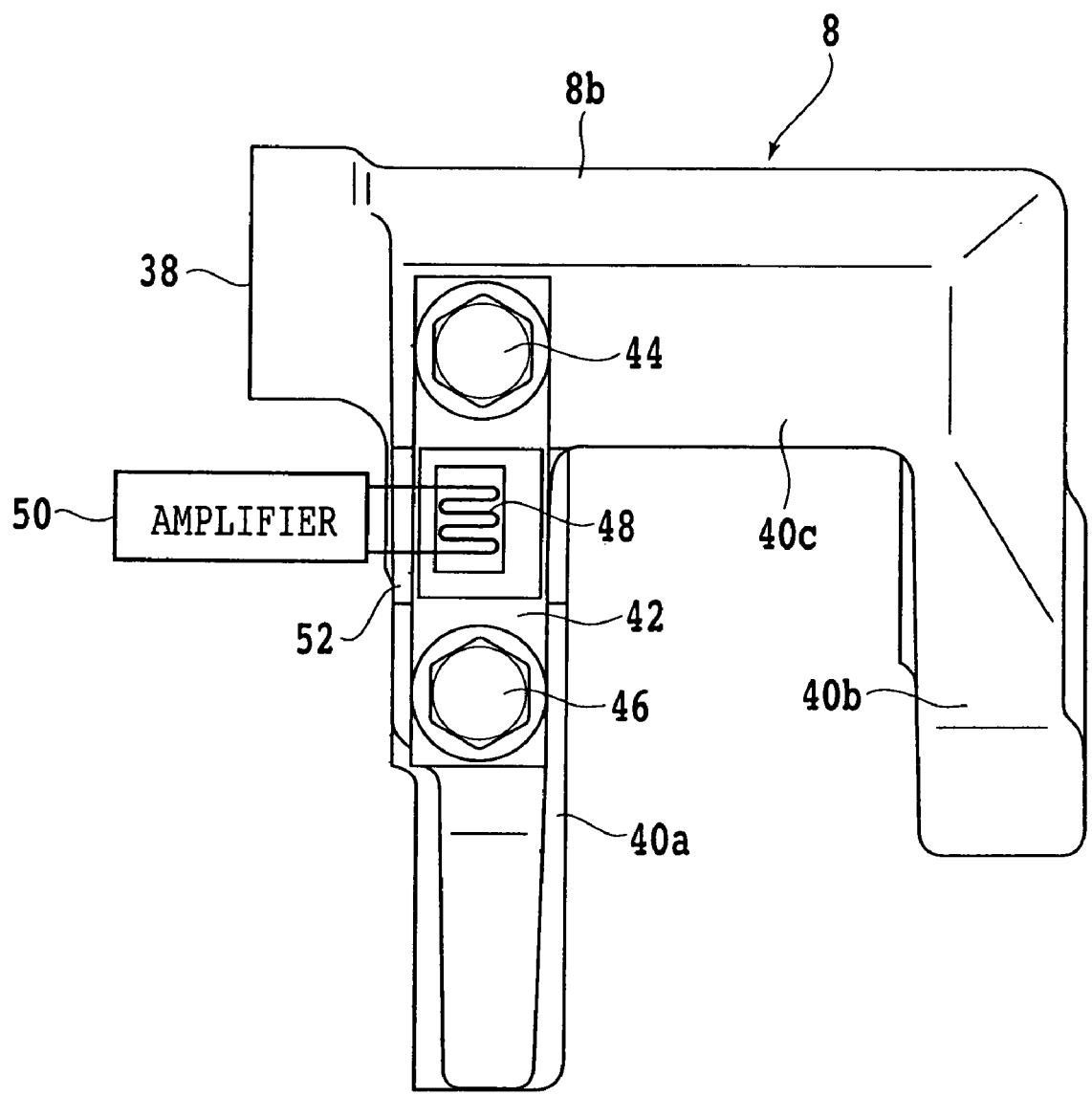
FIG. 5 is a right side view of FIG. 4.
Figure 6:
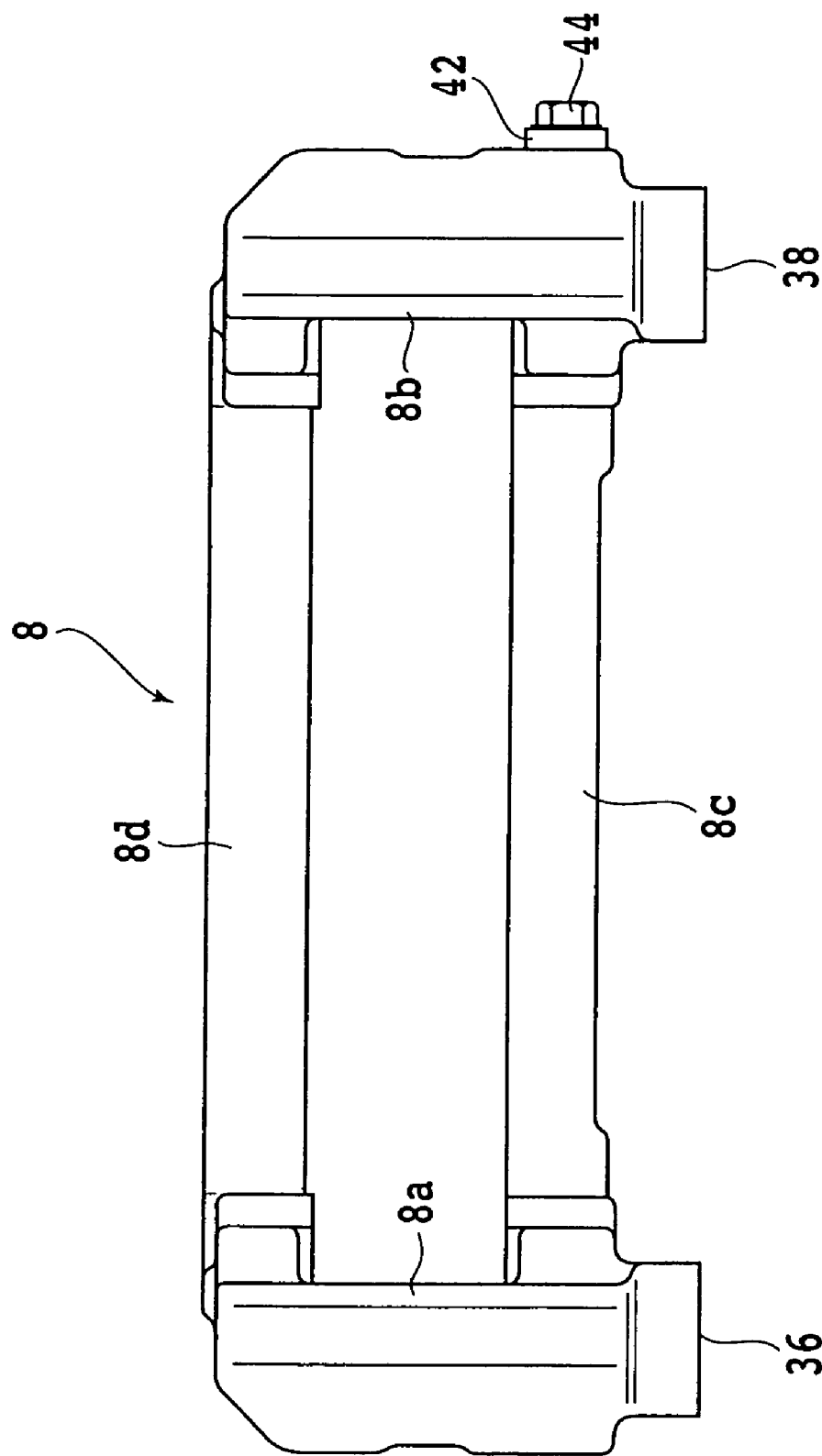
FIG. 6 is a plan view of FIG. 4.

Referring to FIG. 4, there is shown an elevational view of an essential part of the brake force detecting device according to the first preferred embodiment of the present invention. In FIG. 4, the brake disc 2, the friction pads 19 and 21, and the brake caliper 6 are not shown. FIG. 5 is a right side view of FIG. 4, and FIG. 6 is a plan view of FIG. 5. As shown in FIGS. 4 to 6, the caliper bracket 8 has a substantially U-shaped configuration as viewed in elevation such that it is composed of a pair of brake load receiving portions (brake torque receiving portions) 8a and 8b, an inner connecting portion (inner bridge portion) 8c for connecting the brake load receiving portions 8a and 8b, and an outer connecting portion (outer bridge portion) 8d for connecting the brake load receiving portions 8a and 8b so as to extend in parallel to the inner connecting portion 8c on the axially outer side thereof.

As best shown in FIG. 4, the caliper bracket 8 has two tapped holes 32 and 34 for threaded engagement with the respective bolts 10 and 12, and further has two engaging holes 36 and 38 for slidable engagement with the respective slide pins 15 and 17. The caliper bracket 8 is substantially symmetrical with respect to the line connecting the center of rotation of the brake disc 2 and the center of the piston 24. Referring to FIG. 5, the brake load receiving portion 8b is composed of an inner arm portion 40a connected to the inner connecting portion 8c, an outer arm portion 40b connected to the outer connecting portion 8d, and a connecting portion 40c for connecting the inner arm portion 40a and the outer arm portion 40b.

A sensor plate 42 is fixed to the inner arm portion 40a of the brake load receiving portion 8b by a pair of bolts 44 and 46 spaced apart from each other. The sensor plate 42 extends in the longitudinal direction of the inner arm portion 40a. A strain gauge 48 is attached to the sensor plate 42. The strain gauge 48 is connected to an amplifier 50 for amplifying an output from the strain gauge 48. As apparent from FIG. 4, the brake load receiving portion 8b is formed with a recess 52 on the back side of the sensor plate 42.

In the case of braking during forward running of the vehicle, the friction pads 19 and 21 come into pressure contact with the brake disc 2 during rotation of the brake disc 2, so that the friction pads 19 and 21 are dragged by the brake disc 2 to move in the rotational direction of the brake disc 2, and the pad back plates 18 and 20 abut against the brake load receiving portion 8b of the caliper bracket 8. Since the sensor plate 42 is fixed to the outer side of the inner arm portion 40a by the bolts 44 and 46, compressive strain is generated in the sensor plate 42 in the case that the brake load receiving portion 8b receives a brake load (brake torque).

This compressive strain is detected by the strain gauge 48, and an output from the strain gauge 48 is amplified by the amplifier 50 connected to the strain gauge 48, thereby detecting the brake force according to the amount of strain in the sensor plate 42. The strain in the sensor plate 42 is generated only when the brake torque is transmitted through the brake load receiving portion 8b of the caliper bracket 8. Accordingly, the strain in the sensor plate 42 is hardly influenced by a vertical force and a lateral force, so that the brake force can be detected accurately.

Further, the recess 52 is formed on the brake load receiving portion 8b at a position on the back side of the sensor plate 42 bolted to the brake load receiving portion 8b, so that the sensor plate 42 can be deformed more easily upon receiving a brake load than the case that the recess 52 is absent. As a result, larger strain can be produced in the sensor plate 42 to thereby improve the accuracy of detection of a brake force. The sensor plate 42 is mounted in a direction perpendicular to the direction of application of a brake force to the brake load receiving portion 8b of the caliper bracket 8, so that the strain in the sensor plate 42 upon application of the brake force can be stably detected.

In the case that the sensor plate 42 is mounted in a direction parallel to the direction of application of a brake force to the brake load receiving portion 8b, there is a problem such that a contact portion between the caliper bracket 8 and the sensor plate 42 may be shifted upon deformation of the brake load receiving portion 8b, so that strain remains in the sensor plate 42 even after removing the brake force, causing the deviation of a zero point. To the contrary, according to this preferred embodiment, this problem can be eliminated because the sensor plate 42 is mounted in a direction perpendicular to the direction of application of a brake force.

As a modification, any strain detecting means other than the strain gauge 48 may be mounted on the sensor plate 42. Further, two sets of sensor plate and strain detecting means may be provided at the opposite ends of the caliper bracket in the circumferential direction of the brake disc, thereby allowing the detection of a brake force both in forward running and in reverse running of the vehicle.

Figure 7:
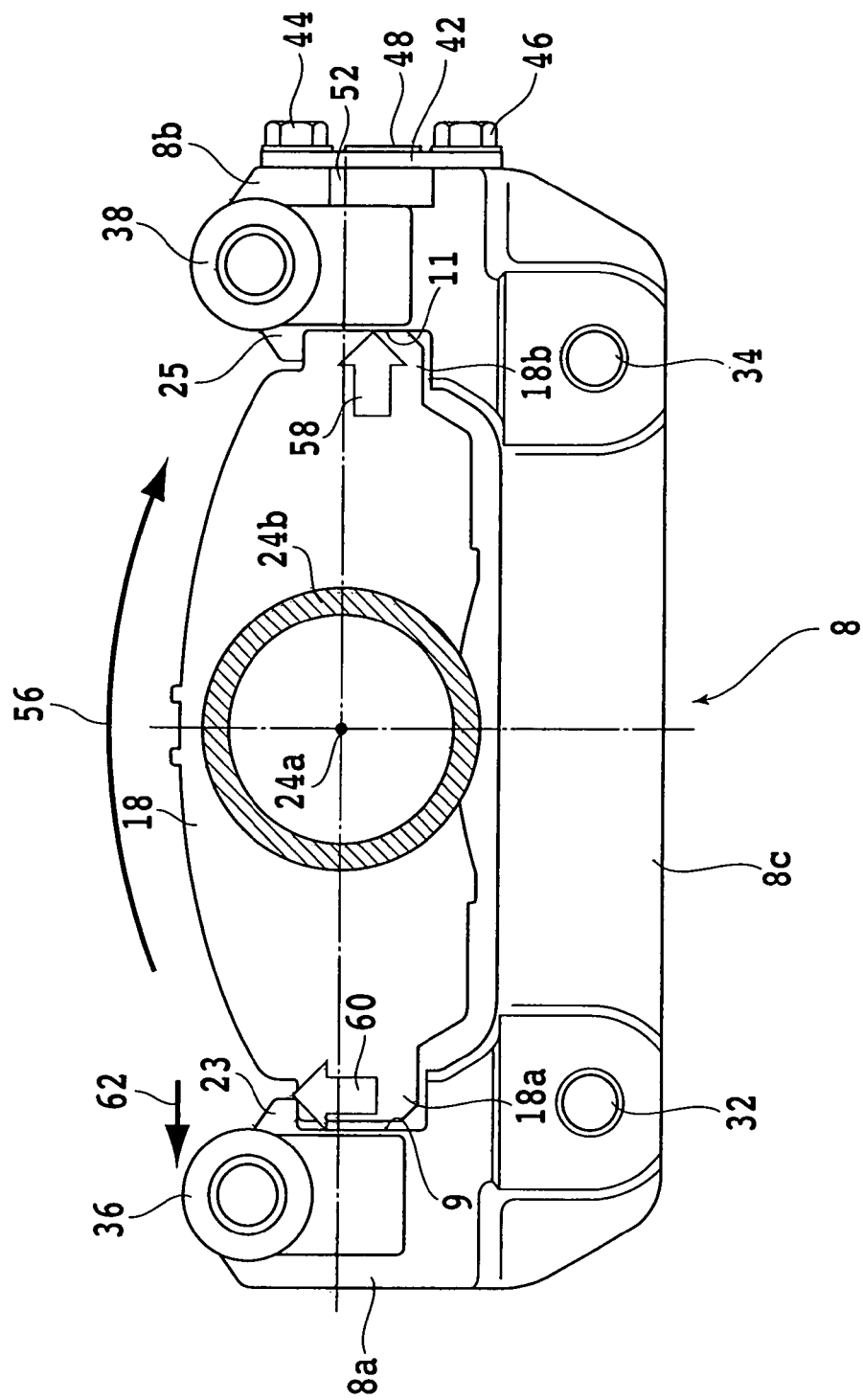
FIG. 7 is an elevational view showing an essential part of a brake force detecting device as a comparison to a second preferred embodiment of the present invention.

FIG. 7 shows an essential part of a brake force detecting device as a comparison for illustrating the problem to be solved by the present invention. FIG. 7 is similar to FIG. 4 except that the pad back plate 18 is shown in FIG. 7. As shown in FIG. 7, the pad back plate 18 has opposite projecting end portions 18a and 18b. The brake load receiving portion 8a is formed with a recess 9 for receiving the projecting end portion 18a, and the brake load receiving portion 8b is formed with a recess 11 for receiving the projecting end portion 18b.

Reference numeral 24a denotes the center of application of pressure by the piston 24 (the center of the cylindrical piston 24 in its radial direction), and reference numeral 24b denotes a pressure applying portion of the piston 24. The brake load receiving portion 8b of the caliper bracket 8 extends from the radial inside of the brake disc 2 to the radial outside thereof with respect to a line tangent to a circle about the center of rotation of the brake disc 2 at the pressure application center 24a of the piston 24. Accordingly, in braking during forward running of the vehicle, the friction pads 19 and 21 come into pressure contact with the brake disc 2 during rotation of the brake disc 2 in the direction shown by an arrow 56, so that the friction pads 19 and 21 are dragged by the brake disc 2 to move in the rotational direction 56 of the brake disc 2, and the pad back plates 18 and 20 abut against the brake load receiving portion 8b of the caliper bracket 8. In this case, the point of abutment of each of the pad back plates 18 and 20 against the brake load receiving portion 8b is not stable in such a manner that it comes to the radial inside or radial outside of the above-mentioned tangent line.

In the case that the point of abutment of the pad back plate 18 against the brake load receiving portion 8b comes to the radial inside of the tangent line as shown by an arrow 58, a moment shown by an arrow 60 is generated so that the projecting end portion 18a of the pad back plate 18 circumferentially opposite to the projecting end portion 18b abutting against the brake load receiving portion 8b is moved in the radially outward direction of the brake disc 2. As a result, the projecting end portion 18a of the pad back plate 18 pushes a projecting portion 23 of the brake load receiving portion 8a in the radially outward direction, so that the brake load receiving portion 8a is deformed outside as shown by an arrow 62. Accordingly, the outer bridge portion 8d is stretched to cause undue strain in the sensor plate 42.

Figure 8:
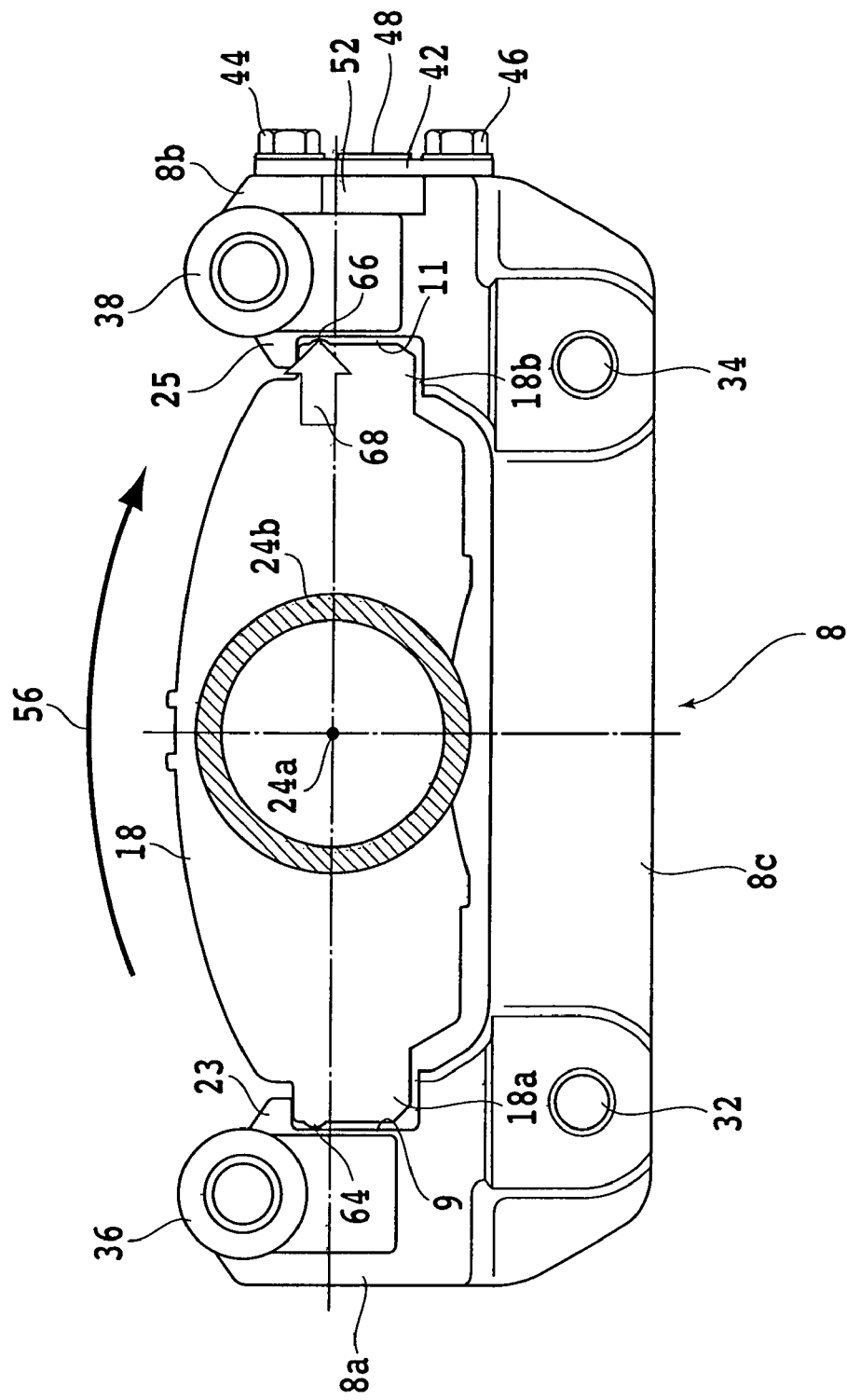
FIG. 8 is an elevational view showing an essential part of a brake force detecting device according to the second preferred embodiment.
Figure 9:
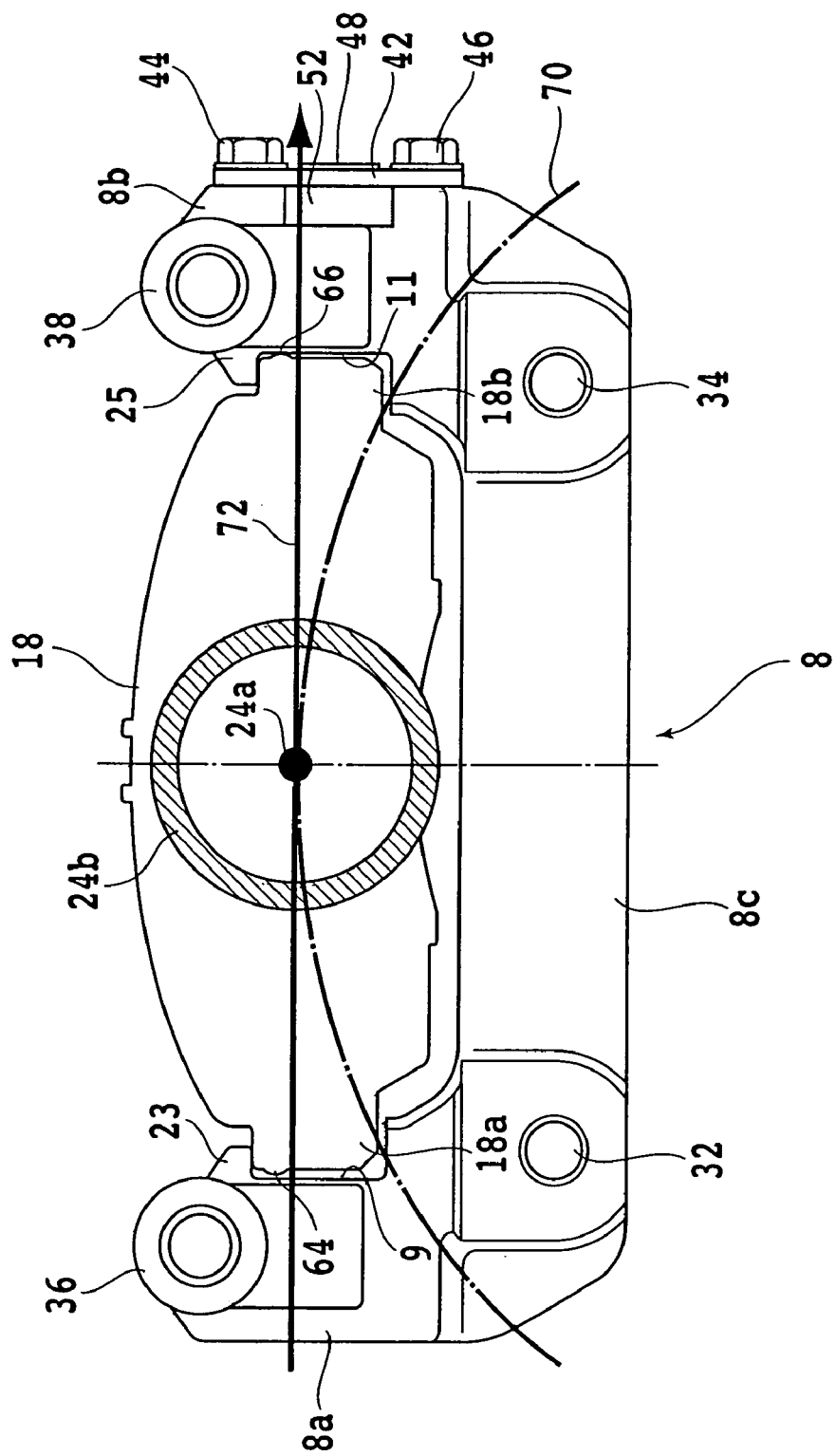
FIG. 9 is a view similar to FIG. 8, showing a part of a circle about the center of rotation of a brake disc and a line tangent to this circle at the center of application of pressure of a piston.
Figure 10:
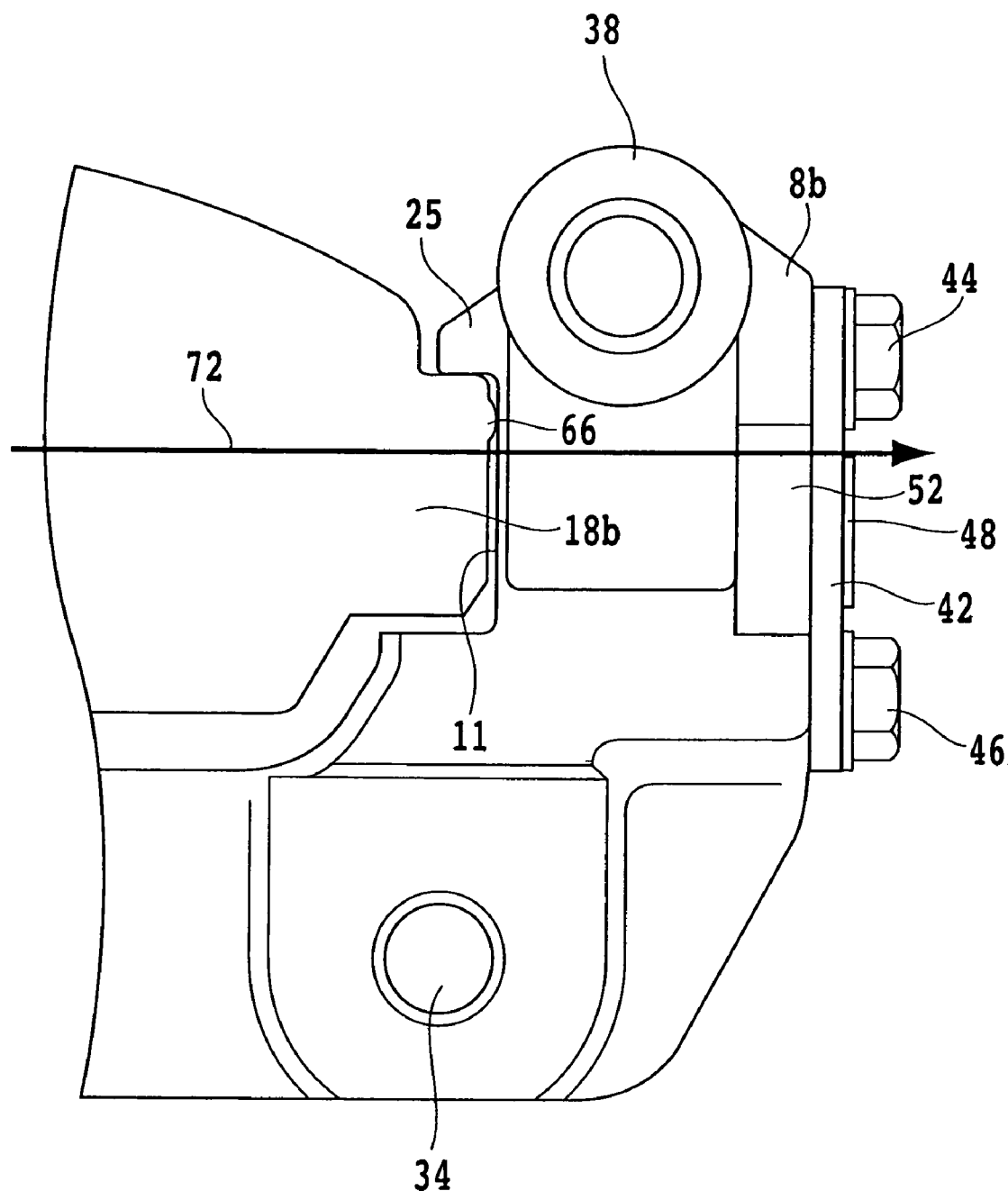
FIG. 10 is an enlarged view of an essential part shown in FIG. 8.

FIG. 8 shows an essential part of a brake force detecting device according to a second preferred embodiment of the present invention configured to solve the above problem. FIG. 9 is a view similar to FIG. 8, showing a part of a circle 70 about the center of rotation of the brake disc 2 and a line 72 tangent to this circle 70 at the pressure application center 24a of the piston 24. FIG. 10 is an enlarged view of an essential part shown in FIG. 8. As best shown in FIG. 9, the projecting end portion 18a of the pad back plate 18 is formed with a projection 64 adapted to abut against the brake load receiving portion 8a (the bottom of the recess 9), and the projecting end portion 18b of the pad back plate 18 is formed with a projection 66 adapted to abut against the brake load receiving portion 8b (the bottom of the recess 11). These projections 64 and 66 are positioned outside of the tangent line 72 in the radial direction of the brake disc 2. Although not shown, the pad back plate 20 also has projections similar to the projections 64 and 66.

Accordingly, in braking during forward running of the vehicle, the friction pads 19 and 21 come into pressure contact with the brake disc 2 during rotation of the brake disc 2 in the direction shown by the arrow 56, so that the friction pads 19 and 21 are dragged by the brake disc 2 to move in the rotational direction 56 of the brake disc 2, and the projections 66 of the pad back plates 18 and 20 abut against the brake load receiving portion 8b of the caliper bracket 8 as shown by an arrow 68.

In this manner, the pad back plates 18 and 20 abut against the brake load receiving portion 8b of the caliper bracket 8 at a position outside of the tangent line 72 in the radial direction of the brake disc 2, so that the moment shown by the arrow 60 in FIG. 7 is not generated. That is, the projecting end portion 18a of the pad back plate 18 is not moved in the radially outward direction of the brake disc 2. As a result, the projecting portion 23 of the brake load receiving portion 8a is not pushed up by the projecting end portion 18a of the pad back plate 18, so that the brake load receiving portion 8a is not deformed outside and the outer bridge portion 8d is not stretched, resulting in no undue strain in the sensor plate 42. Thus, only the brake load receiving portion 8b of the caliper bracket 8 is deformed by the pad back plates 18 and 20, and only the strain in the sensor plate 42 due to this deformation can be detected, so that a linear strain characteristic can be obtained to thereby improve the detection accuracy of the brake force detecting device.

Figure 11:
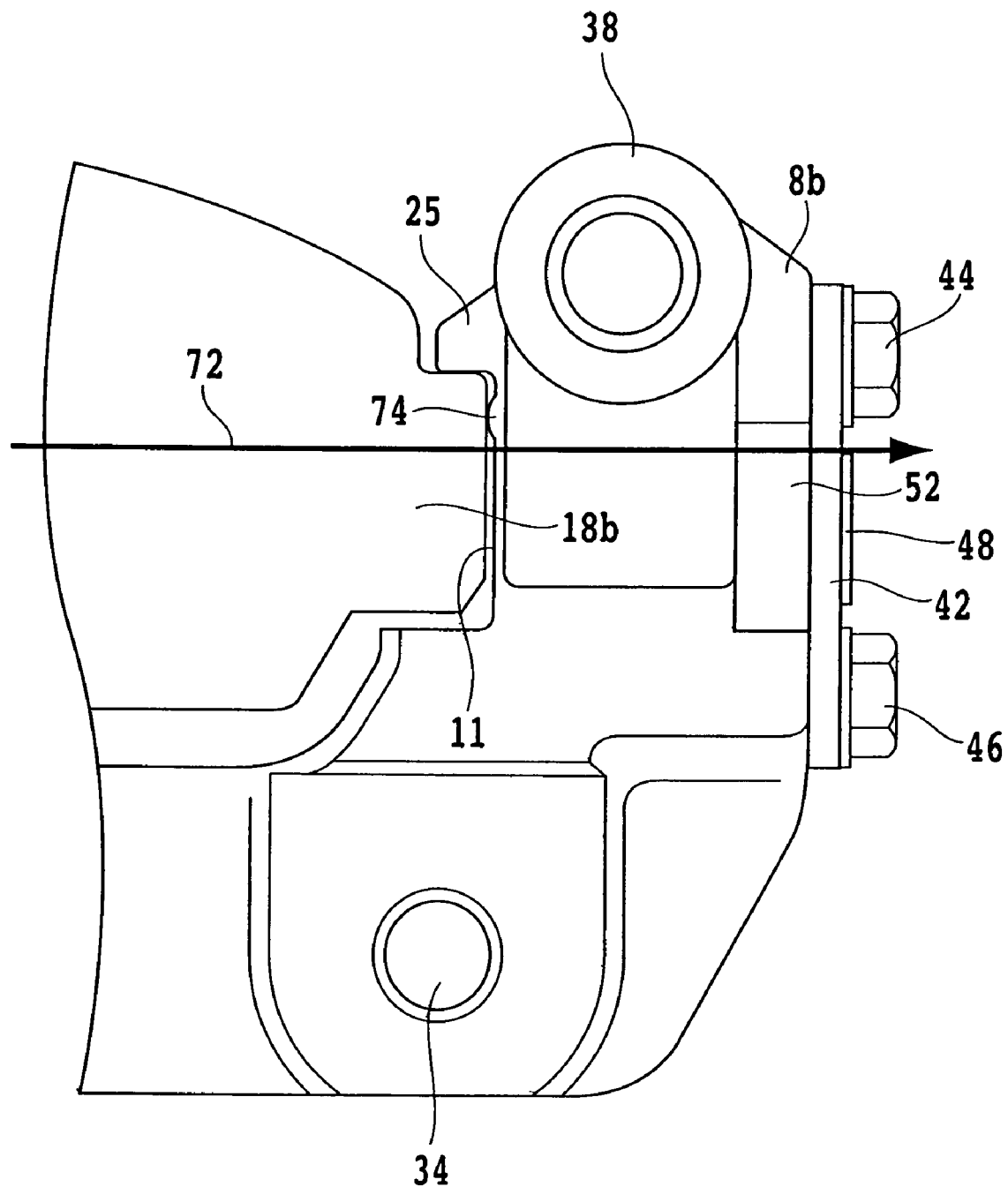
FIG. 11 is a view similar to FIG 10, showing a modification of the second preferred embodiment.

While the projection 66 is formed on the projecting end portion 18b of the pad back plate 18 in this preferred embodiment, a projection 74 may be formed on the bottom of the recess 11 of the brake load receiving portion 8b as shown in FIG. 11. The projection 74 is positioned outside of the tangent line 72 in the radial direction of the brake disc 2.

Figure 12:
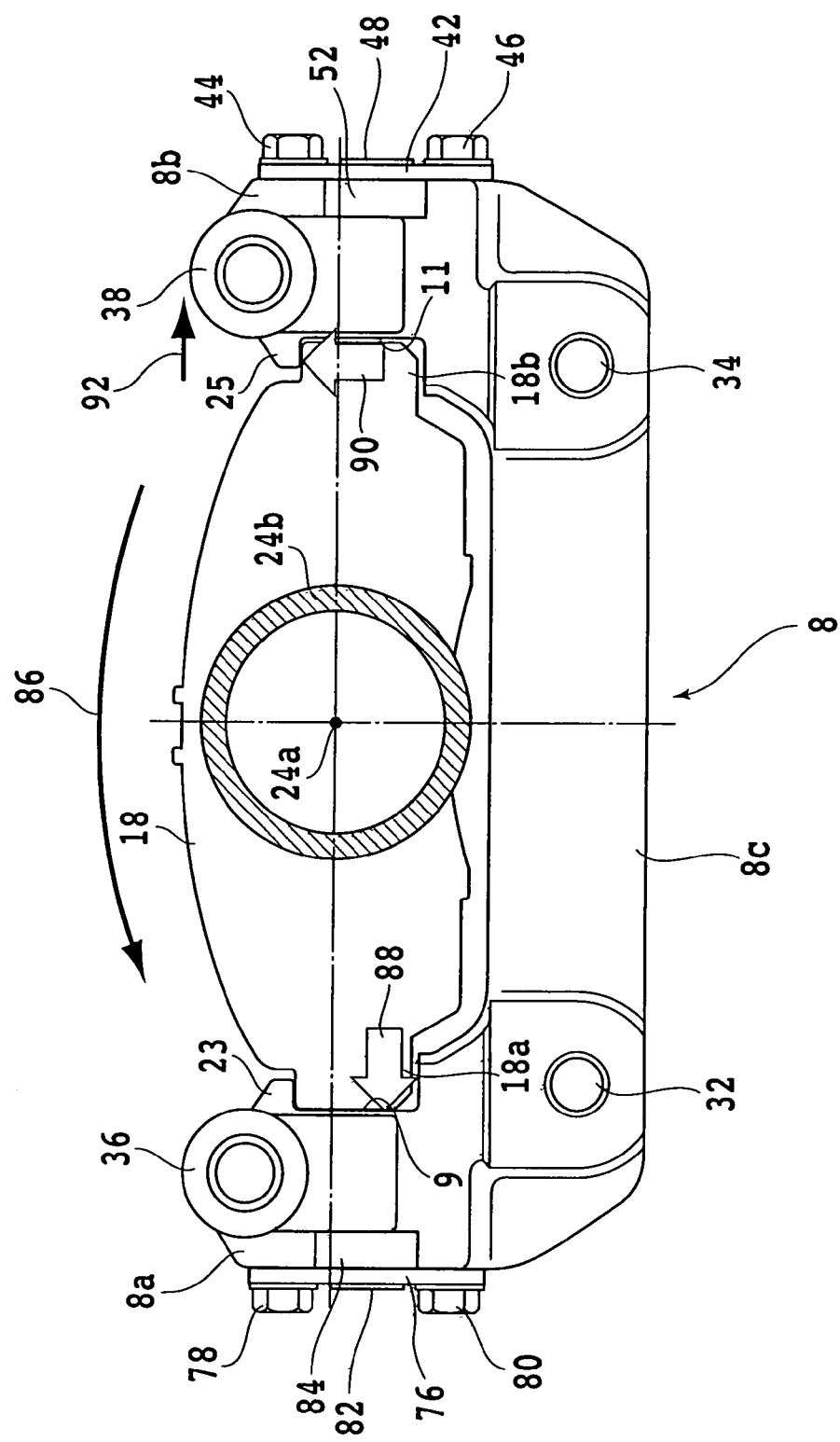
FIG. 12 is an elevational view for illustrating the operation of a brake force detecting device as a comparison to a third preferred embodiment of the present invention in the case of reverse running of a vehicle.

There will now be described a brake force detecting device capable of detecting a brake load in braking during reverse running of the vehicle by mounting a strain sensor on the brake load receiving portion 8a with reference to FIGS. 12 and 13. FIG. 12 shows a comparison, and FIG. 13 shows a third preferred embodiment of the present invention.

Figure 13:
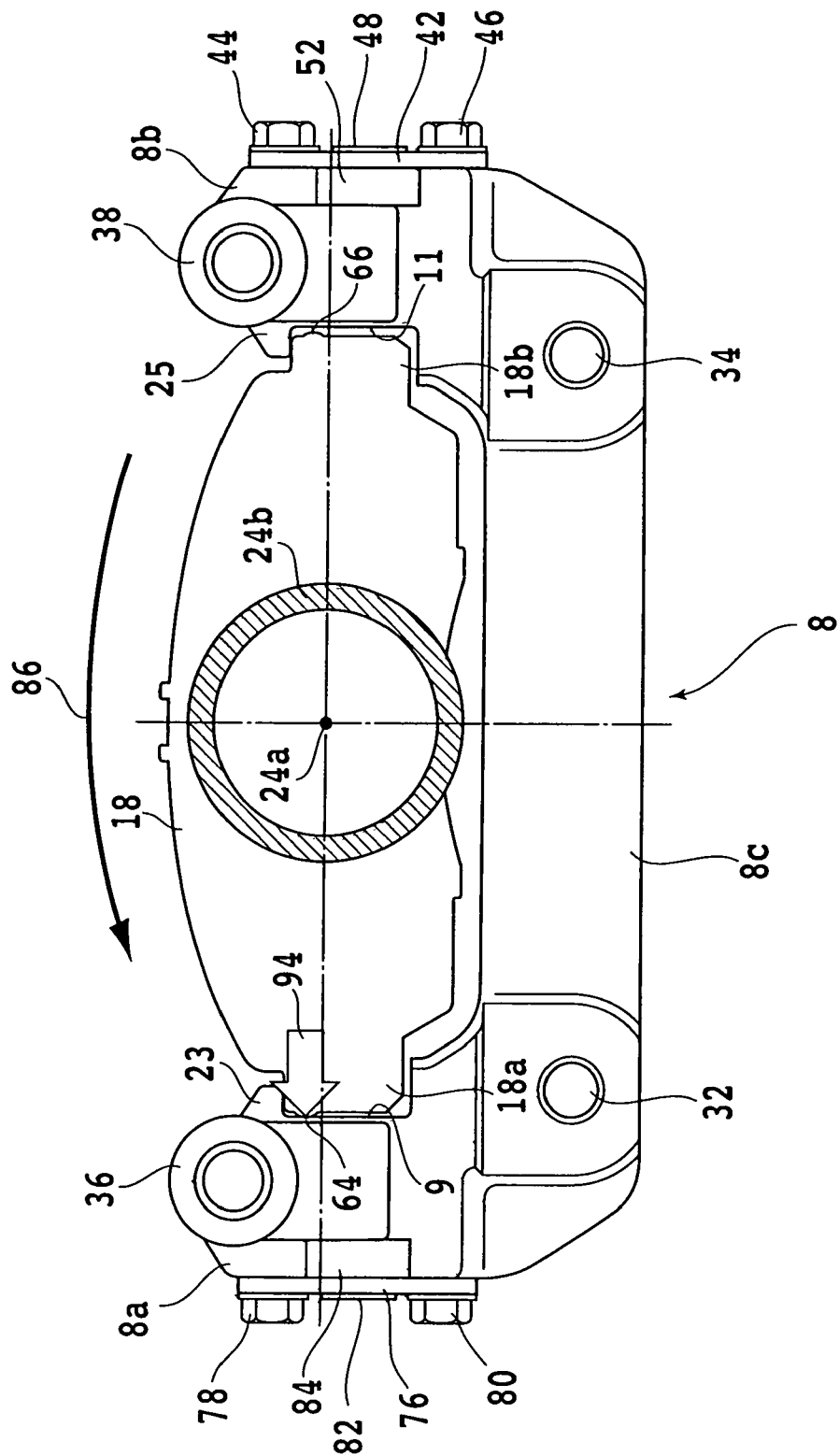
FIG. 13 is an elevational view of a brake force detecting device according to the third preferred embodiment.

As shown in FIGS. 12 and 13, a sensor plate 76 is fixed to the inner arm portion of the brake load receiving portion 8a by a pair of bolts 78 and 80 spaced apart from each other. The sensor plate 76 extends in the longitudinal direction of the inner arm portion of the brake load receiving portion 8a. A strain gauge 82 is attached to the sensor plate 76. The strain gauge 82 is connected to an amplifier (not shown) for amplifying an output from the strain gauge 82. As apparent from FIGS. 12 and 13, the brake load receiving portion 8a is formed with a recess 84 on the back side of the sensor plate 76.

In the case of braking during reverse running of the vehicle in the comparison shown in FIG. 12, the brake disc 2 is rotated in the direction shown by an arrow 86 opposite to the rotational direction during forward running, so that the friction pads 19 and 21 are dragged by the brake disc 2 to move in the rotational direction 86 of the brake disc 2, and the pad back plates 18 and 20 abut against the brake load receiving portion 8a of the caliper bracket 8. In the case that the point of abutment of the projecting end portion 18a of the pad back plate 18 against the brake load receiving portion 8a comes to the radial inside of the tangent line 72 as shown by an arrow 88, a moment shown by an arrow 90 is generated so that the projecting end portion 18b of the pad back plate 18 circumferentially opposite to the projecting end portion 18a abutting against the brake load receiving portion 8a is moved in the radially outward direction of the brake disc 2. As a result, the projecting end portion 18b of the pad back plate 18 pushes a projecting portion 25 of the brake load receiving portion 8b in the radially outward direction, so that the brake load receiving portion 8b is deformed outside as shown by an arrow 92, causing undue strain in the sensor plate 76.

In the third preferred embodiment shown in FIG. 13, the projecting end portion 18a has the projection 64 adapted to abut against the brake load receiving portion 8a (the bottom of the recess 9). The projection 64 is positioned outside of the tangent line 72 in the radial direction of the brake disc 2, so that the moment shown by the arrow 90 in FIG. 12 is not generated. That is, the projecting end portion 18b of the pad back plate 18 is not moved in the radially outward direction of the brake disc 2.

As a result, the projecting portion 25 of the brake load receiving portion 8b is not pushed up by the projecting end portion 18b of the pad back plate 18, so that the brake load receiving portion 8a is not deformed outside and the outer bridge portion 8d is not stretched, resulting in no undue strain in the sensor plate 76. Thus, only the brake load receiving portion 8a of the caliper bracket 8 is deformed by the pad back plates 18 and 20, and only the strain in the sensor plate 76 due to this deformation can be detected, so that a linear strain characteristic can be obtained also in the reverse running to thereby improve the detection accuracy of the brake force detecting device.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A braking device including:
   a wheel support for rotatably supporting a wheel;
   a brake disc rotating with said wheel;
   a pair of friction pads provided on both sides of said brake disc;
   a brake caliper containing a pressure member for pressing said friction pads against said brake disc, said pressure member being moved toward and away from said brake disc in a direction parallel to the axis of said brake disc; and
   a caliper bracket for supporting said friction pads at opposite end portions in of the friction pads the circumferential direction of said brake disc, said caliper bracket having a load receiving portion for receiving a brake load and a caliper supporting portion for supporting said brake caliper;
   said load receiving portion of said caliper bracket being separate from said caliper support portion, and
   said braking device comprising a strain detecting device provided on said load receiving portion of said caliper bracket.

2. The braking device according to claim 1, wherein said strain detecting means comprises
   a sensor plate fixed to an outside surface of said load receiving portion; and
   a strain sensor fixed to said sensor plate for detecting strain.

3. The braking device according to claim 2, wherein said load receiving portion has a recess on the back side of said sensor plate.

4. The braking device according to claim 1, wherein said load receiving portion comprises
   a first load receiving portion adapted to come into contact with one of said opposite end portions of each friction pad and
   a second load receiving portion adapted to come into contact with the other of said opposite end portions of each friction pad; at least one of said opposite end portions of each friction pad or at least one of said first and second load receiving portions has a projection; and said projection is positioned outside of a line tangent to a circle about the center of rotation of said brake disc at the center of application of pressure of said pressure member.

5. The braking device according to claim 1, further including a knuckle, and said caliper bracket is fixed to a knuckle.

6. The braking device according to claim 4, wherein said projection is provided at a contact interface between one of said first and second load receiving portions of said caliper bracket and one of said opposite end portions of each friction pad.

* * * * *